United States Patent [19]

Tenzer

[11] Patent Number: 4,551,164
[45] Date of Patent: Nov. 5, 1985

[54] MICROBIAL PLANT GROWTH PROMOTER
[75] Inventor: Abraham I. Tenzer, Longwood, Fla.
[73] Assignee: Bio-Organics, Inc., New York, N.Y.
[21] Appl. No.: 538,985
[22] Filed: Oct. 4, 1983
[51] Int. Cl.⁴ .......................................... C05F 11/08
[52] U.S. Cl. ................................................ 71/6; 71/7
[58] Field of Search ............................ 71/6, 7, 12, 13

[56] References Cited

U.S. PATENT DOCUMENTS

| | | |
|---|---|---|
| 899,306 | 9/1908 | von der Kammer . |
| 947,795 | 2/1910 | Coates ........................ 71/6 |
| 947,796 | 2/1910 | Coates ........................ 71/6 |
| 947,798 | 2/1910 | Coates ........................ 71/6 |
| 1,099,121 | 6/1914 | Earp-Thomas . |
| 1,320,701 | 11/1919 | Manns . |
| 1,494,435 | 5/1924 | Lipman . |
| 2,098,918 | 11/1937 | Hendrickson . |
| 2,310,652 | 2/1943 | Peter ........................ 71/24 |
| 2,932,128 | 4/1960 | Porter et al. ................ 47/58 |
| 3,115,404 | 12/1963 | Carney ........................ 71/6 |
| 3,186,826 | 6/1965 | del Munro de Rendon ...... 71/6 |
| 3,205,060 | 9/1965 | Lindert ........................ 71/7 |
| 3,472,644 | 10/1969 | Woodside et al. ............. 71/1 |
| 3,499,748 | 3/1970 | Fraser ........................ 71/7 |
| 3,762,910 | 10/1973 | Durrell ........................ 71/23 |
| 3,898,132 | 8/1975 | Hettrick ...................... 71/6 X |
| 4,119,429 | 10/1978 | Lovness ........................ 71/6 |
| 4,155,737 | 5/1979 | Dommergues et al. .......... 71/7 |
| 4,161,397 | 7/1979 | Bellett et al. ................. 71/7 |
| 4,336,051 | 6/1982 | Marquez ........................ 71/6 |
| 4,342,650 | 8/1982 | Erickson et al. ............. 71/13 X |

FOREIGN PATENT DOCUMENTS

| | | | |
|---|---|---|---|
| 595135 | 3/1960 | Canada ........................ | 71/6 |
| 638455 | 3/1962 | Canada ........................ | 71/6 |

Primary Examiner—Ferris H. Lander
Attorney, Agent, or Firm—Bernard, Rothwell & Brown

[57] ABSTRACT

A novel microbial plant growth promoting composition comprising a mixture of a bacteria and algae, and a method of promoting plant growth therewith are disclosed.

18 Claims, 7 Drawing Figures

BAG CULTURE

TOTAL MARKETABLE YIELD

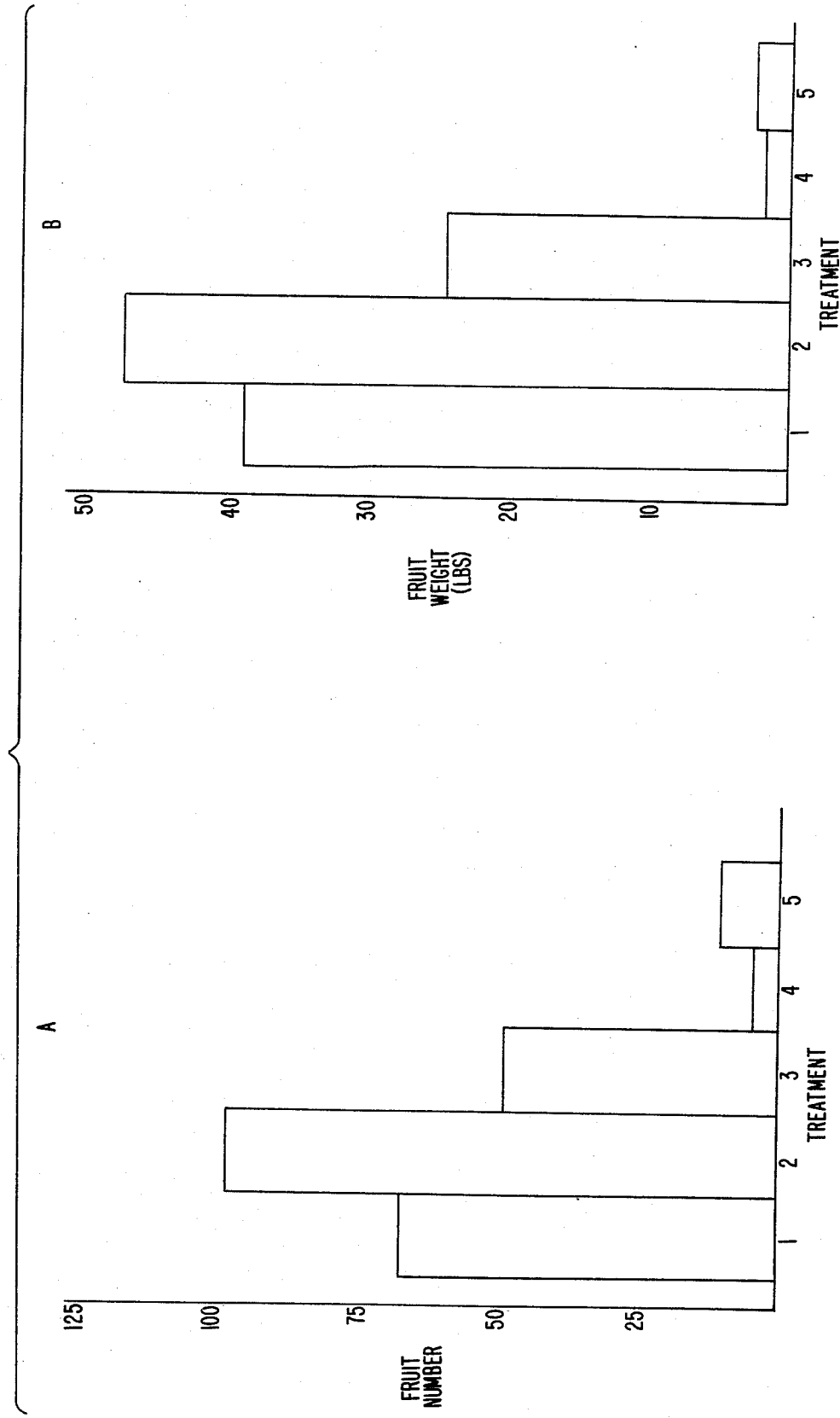
FIG. 6. TOTAL MARKETABLE YIELD

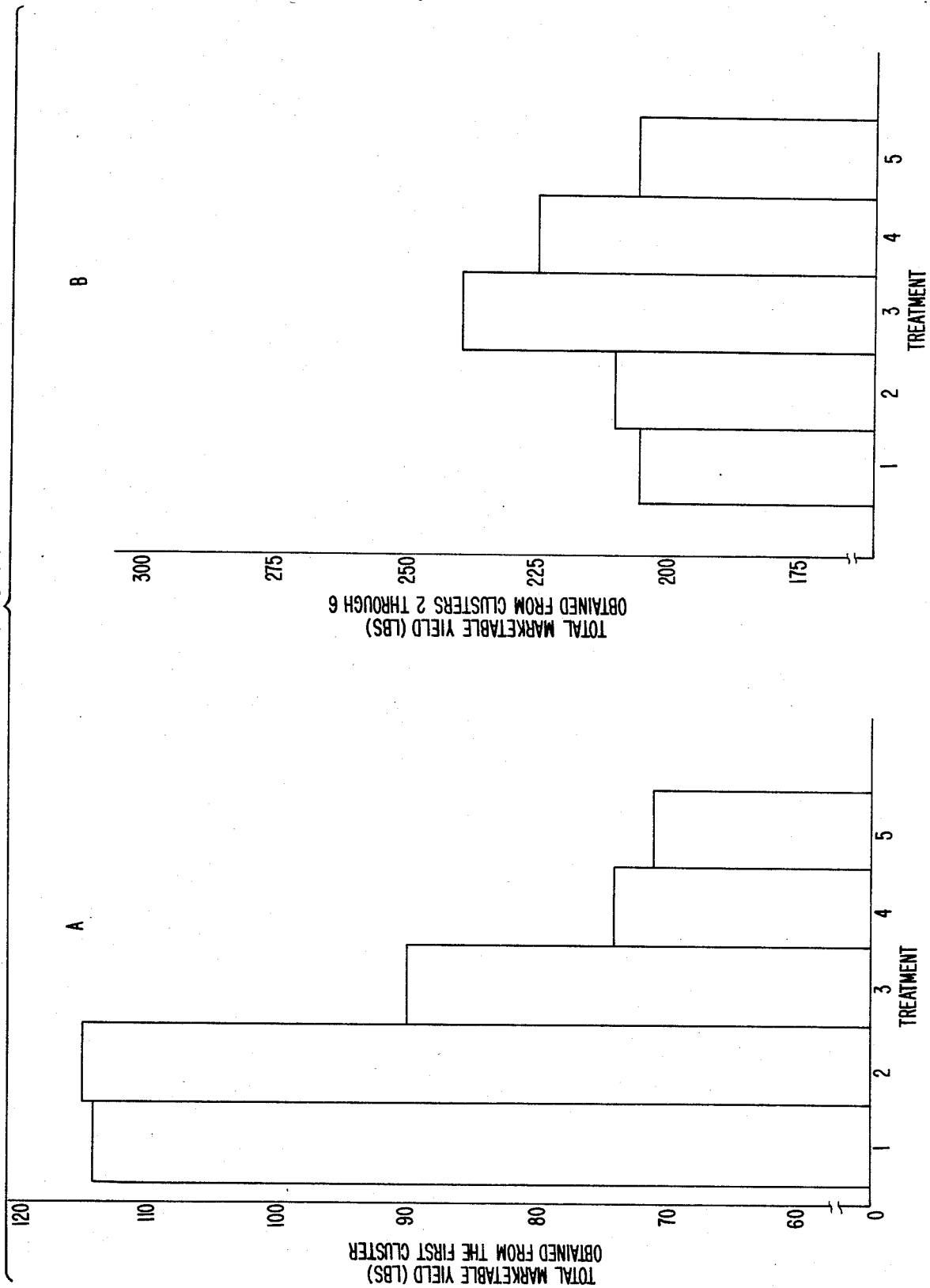

MICROBIAL PLANT GROWTH PROMOTER

BACKGROUND OF THE INVENTION

1. Field of the Invention

The present invention concerns compositions and methods for plant growth promotion. More particularly the invention concerns microbial plant growth promoting compositions and methods for ther use.

2. Description of the Background Art

Since man first began cultivating plant life, there has been an interest in promoting plant growth and increasing yields. This is particularly important in northern climates having limited growing seasons.

Various avenues have been pursued in attempts to promote plant growth. The use of microbes to achieve this result has been of great interest, particularly the use of nitrogen-fixing bacteria. Various means have been devised for contacting the roots of plants with nitrogen-fixing bacteria including inoculation of soil with such bacteria and treating seeds with bacteria-containing compositions.

In addition to nitrogen-fixing bacteria, it is believed that other microorganisms found in the soil benefit plant growth. Although the exact mechanism of this beneficial action is not known, it has been proposed that such microorganisms break down complex soil components to nutrients that are assimilable by the plants. The conditions favoring microbial growth in tropical jungle soils are thought to partially account for the lush plant growth in those regions.

Algae have also been employed for improving soil conditions and hence plant growth. For example, U.S. Pat. 4,336,051 to Marguez describes soil-improving compositions containing gelidum type marine algae. Among the stated purposes of these compositions are to produce beneficial enzymes and to competitively inhibit the growth of pathogenic bacteria.

In light of current and foreseeable demands on the world food supply, there is a continuing interest in developing methods and means of improving plant productivity.

SUMMARY OF THE INVENTION

In accordance with the present invention a microbial plant growth-promoting composition comprises a mixture of a bacteria and an algae. Further disclosed are methods of promoting plant growth by applying to plants or their environment plant growth-promoting amounts of a composition comprising a mixture of a bacteria and an algae.

DETAILED DESCRIPTION OF THE INVENTION

Figure 1:
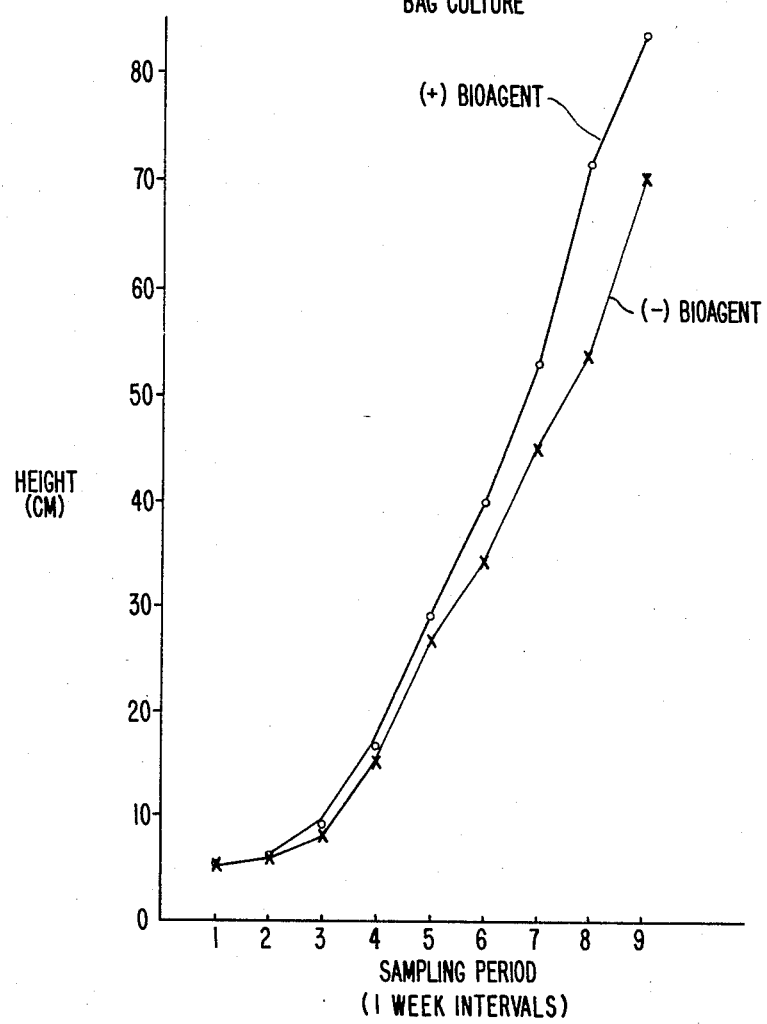

It has surprisingly been discovered that bacteria and algae, when combined and used according to the present invention, have a growth-promoting effect when applied to plants or their environments.

The compositions of the present invention have been shown to have significant positive effects on early plant vigor. Furthermore, use of the compositions of the present invention to promote growth in fruiting plants results in more fruit reaching marketable size faster than such plants grown without use of the composition. This is particularly beneficial to farming in northern climates, where an earlier harvest is important.

Preferred bacteria for use according to the present invention are of the genera Escherichia and Bacillus, with *B.subtilis* being particularly preferred because of its non-pathogenicity. Algal components of the compositions are advantageously of the division Chlorophyta (green algae), with algae of the order Chlorococcales being preferred. Algae of the genus Chlorella are particularly preferred, with *Chlorella saccharophilia* being most preferred.

The bacterial and algal components of the composition of the present invention are advantageously separately prepared in appropriate nutrient mediums under growth conditions and then combined and incubated in a nutrient medium under growth conditions to produce a final product. Growth conditions include a physiologically acceptable pH and temperature. Nutrient mediums contain assimilable sources of carbon, nitrogen and essential trace minerals, vitamins and growth factors. Various sugars, such as lactose, glucose, or crude carbohydrates such as molasses, and the like may be used as suitable sources of carbon. Inorganic ammonium salts, such as ammonium nitrate, ammonium sulfate, ammonium phosphate and the like and protein extracts, such as meat broths, tryptose broth, soybean meal and the like can provide sources of nitrogen. Mineral salts, such as sodium, potassium, calcium, magnesium, and molybdenum salts of chloride, sulfate, phosphate and the like can be used to provide trace mineral requirements. In addition, essential growth factors, such as vitamins can be advantageously supplied as commerically available preparations, such as yeast extracts and the like. Particularly preferred nutrient media for preparing the bacterial and algal components are described below in Example I.

After the bacterial and algal cultures have been grown to suitable cell densities, e.g. from about $2 \times 10^6$ to $10 \times 10^6$, preferably about $4 \times 10^6$ to about $6 \times 10^6$ cells/ml for the bacterial culture and from but $10 \times 10^6$ to about $20 \times 10^6$, preferably about $14 \times 10^6$ to about $16 \times 10^6$ cells/ml for the algal culture, the two cultures are mixed together. To the resulting mixture is added additional nutrients, and the mixture is incubated under growth conditions. Whey may advantageously be used as a nutrient source, and those skilled in the art will recognize that other sources of carbon, nitrogen, minerals and growth factors, as described above, may be employed. The medium also advantageously includes a stabilizing amount of soresepinium (an extract from Yucca, obtained from Ritter Brothers, International, Los Angeles, California, USA). The concentration of soresepinium is preferably from about 0.5% to about 2%, preferably between about 1% and about 1.5% by volume, with a concentration of about 1.25% by volume being particularly preferred. A lipase is also preferably added to the mixture during the incubation in an amount sufficient to stabilize the mixture against decomposition. The concentration of lipase is preferably from about 0.5% to about 2%, preferably from about 1% to about 1.5% by volume, with a concentration of about 1.25% by volume being particularly preferred. Generally, the mixture is incubated for about 1-4 weeks, preferably 2-3 weeks at a temperature of from about 15° C. to about 40° C., preferably of from about 20° C. to about 25° C.

The resulting bacteria-aglae composition can be stabilized by terminating the growth of the cells by acidifying with a non-toxic acids, such as lactic acid or acetic acid. The pH is preferably lowered to about 3-5, preferably about 4.0. A preserving-amount of a preservative, such as sodium benzoate is also added. Preferred compositions further contain vitamin B-12 in a stabilizing amount. It is particularly preferred that the vitamin B-12 be added to the composition in an amount within range of from about 1.5 gm/gallon to about 5 gm/gallon of the composition, with an amount of about 2 gm/gallon of the composition being most preferred.

The present invention further relates to a method of regulating plant growth using the microbial plant growth regulating composition. The preferred methods of plant treatment are irrigation or spraying. Alternatively, seeds may be treated with the composition by soaking the seeds preferably for from about 2 to about 4 hours in the composition prior to planting. The composition is applied in a growth-promoting amount. This amount will vary, depending on the application means, climatic and soil conditions, and the particular crop involved. Generally, from about 1 lb. to about 3 lbs. per acre is employed, preferably from about 1.5 lbs. to about 2 lbs. per acre.

In hydroponic applications, the composition is added directly to the nutrient solution. The ratio of microbial composition to nutrient solution is advantageously approximately 0.5 to 3.0 ml microbial composition/80 gallon nutrient medium.

The invention is further illustrated by the following examples which are not intended to be limiting.

EXAMPLE 1

Cultures of *Bacillus subtilis* and *Chlorella sacchorophila* were separately prepared and then combined and treated to produce a final product according to the following procedure.

Preparation of the Bacterial Culture Component

Samples of *Bacillus subtilis* (obtained from the American Culture Collection of Rockville, Maryland as ATCC #6461) were added to an enrichment medium consisting of lauryl tryptose broth (Difco #0241-02-7, Difco, Detroit, Michigan) containing about 3.5% by volume lactose at a pH of 6.8 to 7.0. The mixture was incubated at a temperature of 35° C. plus or minus 1° C. for 24 hours to complete replacement of lactose by $CO_2$. The pH of the mixture was adjusted to between 6.5 and 6.8 with the aid of a pH sensitive dye (Bright Green Laboratory Bile, Difco #007-01-2). The mixture was then incubated at a temperature of 35° C. plus or minus 1° C. for 24 hours.

Isolation of the culture was accomplished using a nutrient agar medium (Difco #0001-02) composed of 3 g/L beef extract, 5 g/L peptone (Difco) and 15 g/L agar at a pH of 6.8 to 7.0. The mixture was then incubated at a temperature of 44.5° C. plus or minus 0.1° C. in a waterbath for 24 to 48 hours until a count of 5,000,000 cells/ml was achieved.

Preparation of the Algal Culture Component

Samples of *Chlorella saccharophila* (obtained from the American Type Culture Collection of Rockville, Maryland, U.S.A. as ATCC #30408) were added to an algal protose agar medium consisting of 15 to 20 g/L agar, 0.2 to 0.3 g/L sodium nitrate, 2 g/L calcium chloride, 0.5 g/L magnesium sulfate, 15 g/L potassium phosphate, 3.0 g/L sodium chloride, 7.0 to 8.0 g/L protose peptone, 0.2 g/L molybdenum sulfate, and balance to one liter de-ionized water at a pH of 6.5 to 6.8. The mixture was incubated at a temperature of 22° C. to 25° C. for 2 to 3 weeks in sunlight.

The mixture was transferred to a specific medium consisting of the algal protose agar medium described above but without molybdenum sulfate for 2 to 3 days to isolate the culture and achieve a count of 15,000,000/ml. The count was determined by a microscopic count procedure. The culture was then centrifuged to separate the aqueous portion and the aqueous portion was discarded.

Preparation of the Microbial Plant Growth Regulating Composition

The bacterial and algal cultures as prepared above were mixed together for a total count of 20,000,000/ml (15,000,000/ml algae and 5,000,000/ml bacteria). One gallon of the mixture was added to 9 gallons of whey plus one pint of soresepinum, and incubated at a temperature of 20° C. to 22° C. for two to three weeks. The culture was mixed and checked for count four times daily. After 10 days (approximately mid-cycle) one pint lipase (Difco #0431-63-3) was added. At the end of the incubation cycle, the pH was adjusted to 4 plus or minus 0.2 using lactic acid titration and sodium benzoate was added to achieve a concentration of 5 ppm. Finally, 2 gram/gallon of vitamin B-12 assay (Difco #6300-15-7) was added to produce the final product. The final product was stored at 55° F. to 65° F. away from sunlight.

EXAMPLE II

The following experiments were conducted to test the ability of the microbial composition (bioagent) described in Example I to enhance tomato plant growth. These experiments were conducted on two levels. One test was run in a commercial greenhouse using a bag system where a mixture of peatmoss and vermiculite was used in the bags. The other test made use of a growth chamber in which plants were grown in water for short periods of time under constant environmental conditions. In the growth chamber system the bioagents were added to the nutrient solution on a daily basis; while in the bag culture, the bioagents were added twice a week.

I. Greenhouse

Seeds were treated with bioagent and sown. Fifty percent of the seedlings had germinated by the end of the first week. With the appearance of the first true leaf ¼ ounce of fertilizer concentrate per gallon of $H_2O$ was used to water the seedlings. This was maintained for one week when ½ oz of fertilizer concentrate per gallon of water was used. After one month, the seedlings were placed into a bag culture system. During the first two weeks of growth in bags the nutrient solution conductivity was raised from 1.0 to 1.8. The nutrient solution pH was maintained at about 6.5. The plants treated with bioagent received 1.5 ml of bioagent per 50 gallons of nutrient solution twice weekly.

The plants grown in bags containing a peatmoss:vermiculite mix showed a positive response to the addition of bioagents. In FIG. 1 an enhanced growth rate as measured by plant height is evident in the bioagent treated plants. Table 1 shows increases in leaf and stem fresh weights of plants grown in the bioagents. Table 2 shows that the average number of fruit which set in the first cluster was higher in the bioagent treated plants and the weight of each fruit was also greater. The data suggests more fruit in the bioagent treated plants which may reach marketable size faster than in plants grown without bioagent.

II. Growth Chamber

In these experiments tomato seeds were germinated in vermiculite under constant misting. When the seedlings had the first true leaf 2 cm in length, they were removed from the vermiculite and their roots were washed. The seedlings were placed in 1 liter jars containing 750 ml of nutrient solution (conductivity 1.8, pH 6.5). The root zone was constantly aerated by forcing air into the solution with a small pump. Half of the containers received bioagent daily and half did not. The nutrient solution level was maintained between 700-750 ml by adding new solution as needed. The nutrient solution was replaced each week. These seedlings, after being placed in the nutrient solution, were grown for approximately 21 days in the growth chamber.

Two experiments were conducted. Table 3 contains the data from the first run. The data from the second run is contained in Tables 4 and 5. Again, as was the case with the first set, the results show a positive bioagent effect. The dry weight of leaves, stem, and roots is enhanced from 10-20% by bioagent application. Photosynthetic rates are up 29% and leaf areas 12.5%.

TABLE 1

A comparison of the effects of bioagent on stem and leaf fresh weight. These are final measurements and represent the average of 10 plants

| Treatment | Leaf Fresh Wt. (g) | Stem Fresh Wt. (g) |
|---|---|---|
| Bag Culture (+) Bioagent | 227.2 | 102.3 |
| Bag Culture (−) Bioagent | 223.5 | 93.3 |

TABLE 2

The effect of bioagent on plant yield. These are final measurements and represent the average of 10 plants.

| Treatment | Number of Fruit/Cluster | Total Fresh Wt. (g) | Weight/Fruit |
|---|---|---|---|
| Bag Culture (+) Bioagent | 3.0 (+25%) | 654 (+53.8%) | 21.8 (23.1%) |
| Bag Culture (−) Bioagent | 2.4 | 425 | 17.7 |

TABLE 3

The effect of bioagent on tomato seedlings grown in a growth chamber. (average 4 plants)

| Treatment | Photosynthetic Rate (mg $CO_2$/hr) | Avg. Plant Leaf Area ($cm^2$) | FRESH WEIGHT Leaves | Roots | Stem |
|---|---|---|---|---|---|
| Bioagent | 510 (+51.7%) | 242.19 (+14%) | 3.6 (+0%) | .46 (+35%) | 3.70 (+15%) |
| Control | 336 | 209.45 | 3.6 | .3 | 3.17 |

TABLE 4

Growth Chamber Experiment. The effect of bioagent on dry weight accumulation.

| Treatment | Leaf | Stem | Root |
|---|---|---|---|
| Bioagent | .28 g (+27.2%) | .09 g (+12.5%) | .06 g (+20%) |
| Control | .22 g | .08 g | .05 g |

TABLE 5

Growth Chamber Experiment. The effect of bioagent on photosynthesis and leaf area.

| Treatment | Photosynthetic Rate (mg $Co_2$/hr) | Avg. Plant Leaf Area |
|---|---|---|
| Bioagent | 880 (+41.9%) | 274.1 $cm^2$ (+12.5%) |
| Control | 620 | 240.3 $cm^2$ |

EXAMPLE 3

The following experiments were conducted to elucidate the effects of the microbial composition (bioagent) prepared as described in Example I on tomato plant growth in a nutrient film technique (NFT) hydroponic growing system.

Procedure

In these experiments the amount of the microbial composition (volume) added to the nutrient reservoirs and the number of times the bioagent was added each week were altered. The following treatment regime was used:

Treatment 1—2.4 ml microbial composition/80 gal. nutrient solution added daily for the duration of the experiment.

Treatment 2—2.4 ml microbial composition/80 gal. nutrient solution added daily for 2 weeks followed by the addition of 1.2 ml microbial composition/80 gal. of nutrient solution added twice a week for the duration of the experiment.

Treatment 3-2.4 ml microbial composition/80 gal. nutrient solution added daily for 2 weeks followed by the addition of 0.6 ml microbial composition/80 gal. of nutrient solution added twice a week for the duration of the experiment.

Treatment 4–0.6 ml microbial composition/80 gal. of nutrient solution added daily for 2 weeks followed by the addition of 1.2 ml microbial composition/80 gal. of nutrient solution added twice a week for an additional 2 weeks; this was followed by adding 2.4 ml microbial composition/80 gal. of nutrient solution twice a week for the duration of the experiment.

Treatment 5—Control; no microbial composition added.

Each treatment consisted of four NFT troughs 6 inches wide and an 80 gallon nutrient solution reservoir. The cultural practices employed were similar for each treatment and followed normal operating procedures for growing a commercial tomato crop in NFT. The 'Jumbo' cultivar was used throughout this study. Seeds were planted and allowed to grow for 48 days when the seedlings were transplanted into the troughs. The additions of the microbial composition began two weeks later.

Results

Figure 2:
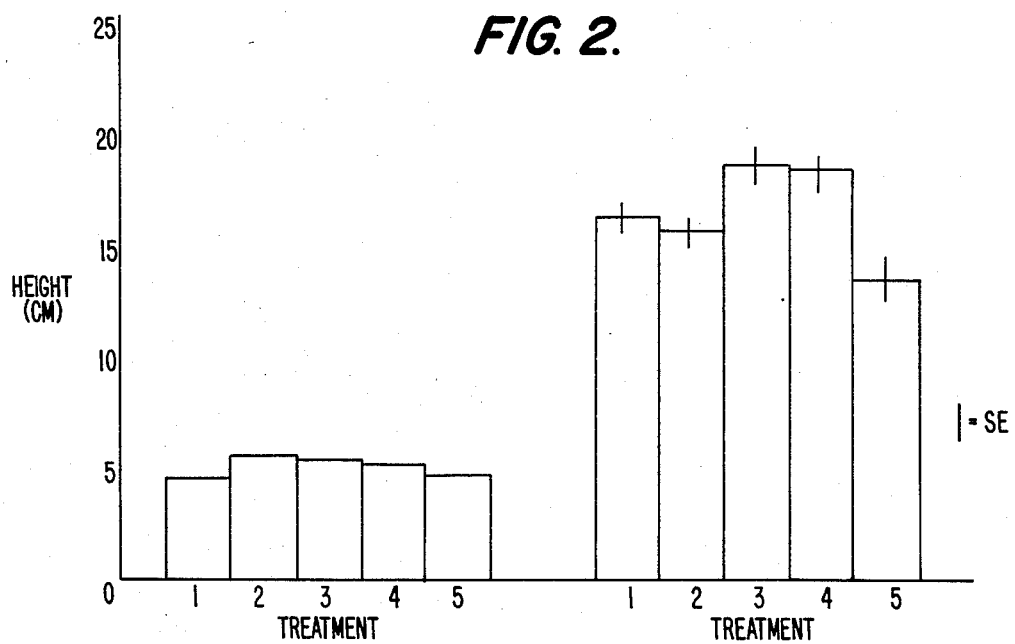
Figure 3:
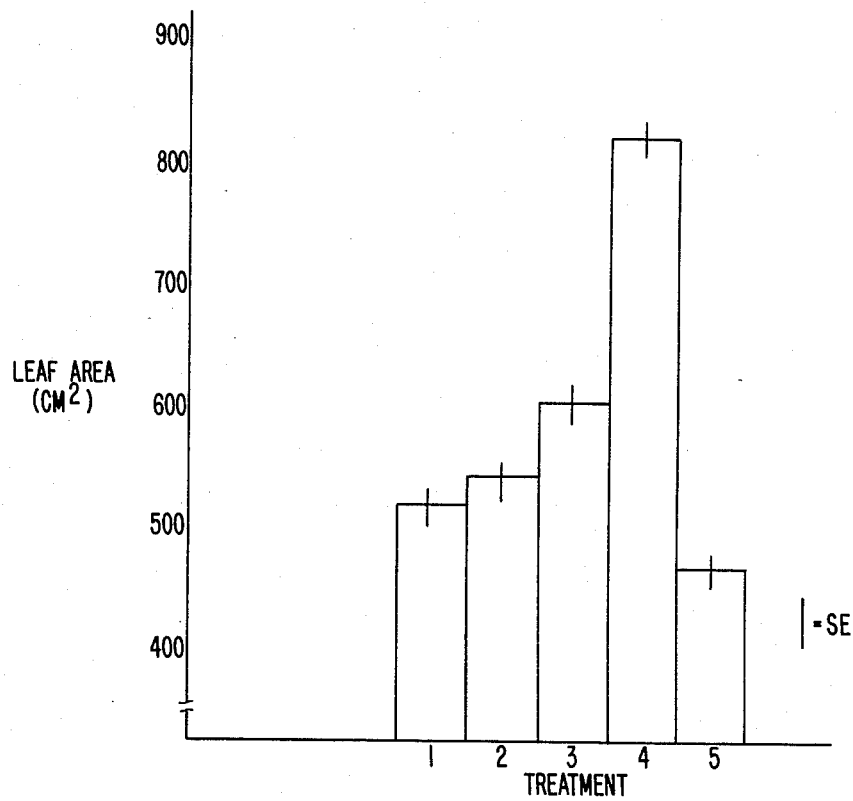
Figure 4:
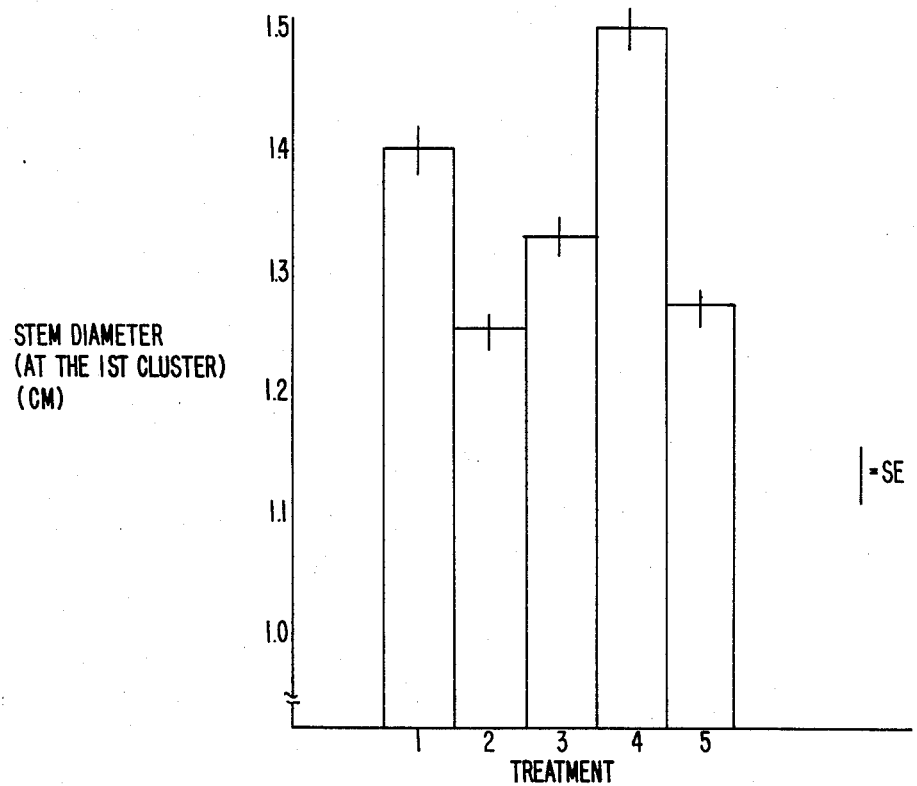

The effects of the various treatments on the vegetative growth of tomatoes can be seen in FIGS. 2, 3, and 4 as well as Table A. FIG. 2 shows that when the addition of the microbial composition began there were little or no differences in height among the treatments. However, after only 2 weeks under the various treatment regimes, the bioagent treated plants were significantly taller than the controls. This response is also seen in Table A, where in every case the fresh weight of the leaves, roots, and stems are higher in the bioagent treated plants than in the control plants. Root length also appears to be somewhat greater in the bioagent treated plants when compared to those of the control.

FIG. 3 also points out that in every case the average leaf area is significantly greater in the bioagent treated plants than in the control plants. This figure also demonstrates that treatment number 4 stimulated leaf growth more so than the other bioagent treatments. This is also demonstrated in FIG. 4 where the stem diameter is much larger in treatments 4 and 1 than in the other experimental treatments.

Figure 5:
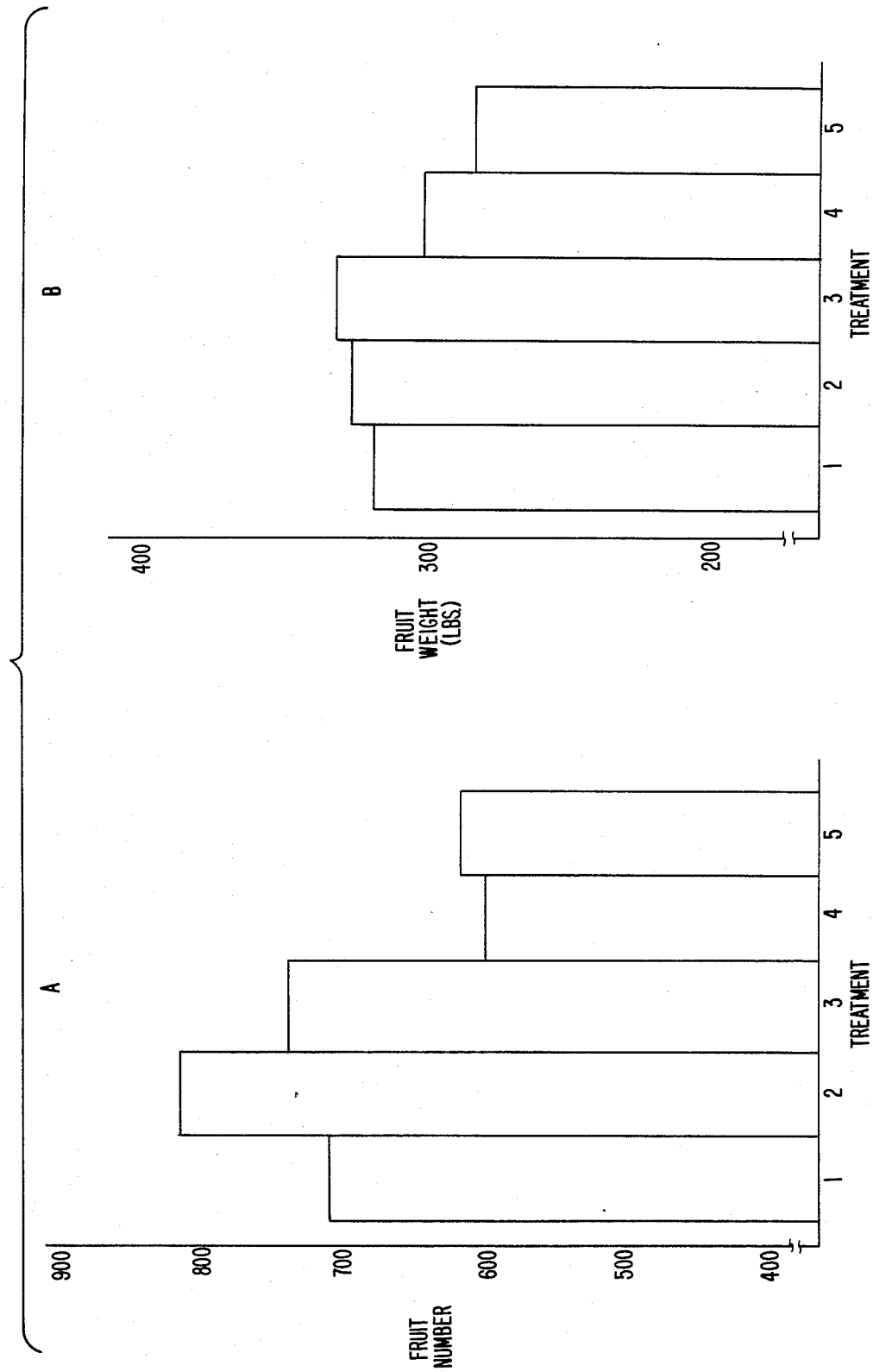

FIG. 5 (A and B) shows that treatments 1, 2 and 3 stimulate both an increase in total fruit number and total fruit weight when compared to the controls.

FIG. 6 (A and B) presents data on total yield approximately 12 weeks after the first addition of the microbial composition. It can be seen that plants in treatments 1, 2, and 3 and, treatment 2, in particular, developed reproductively sooner and therefore started producing marketable fruit earlier.

Tables B and C also contain data concerning the effects of the microbial composition on growth. Treatments tended to increase the distance between clusters (Table B). The microbial composition apparently stimulates earlier development of fruit and has a dramatic effect on yield particularly of the first cluster (FIG. 7A). Treatments 1 and 2 greatly enhance first cluster yield of marketable fruit (FIG. 7A). However, in the later clusters (2–6) treatments 3 and 4 are stimulatory (FIG. 7B). It appears that treatments 1 and 2 with the larger amounts of bioagent stimulate productivity early but the lower applications provided by treatments 3 and 4 may promote increased total marketable yield throughout the growing cycle.

TABLE A

The effect of the microbial composition on vegetative growth of tomato (cv. 'Jumbo'). The data were collected 2 weeks after the start of the treatment. Each data point is the average of 4 plants.

| Treatment Number | Fresh Weight (Grams) | | | Root Length (cm) |
|---|---|---|---|---|
| | Leaf | Stem | Root | |
| 1 | 26.3 | 9.6 | 15.2 | 62.8 (+54.67%) |
| 2 | 23.6 | 8.4 | 12.2 | 43.8 (+7.88%) |
| 3 | 28.8 | 9.9 | 13.0 | 44.2 (+8.86%) |
| 4 | 31.5 | 11.2 | 12.2 | 52.7 (+29.80%) |
| 5 (control) | 17.4 | 5.7 | 7.6 | 40.6 |

TABLE B

The effect of the microbial plant growth composition on the average distance between flower clusters.

| Cluster | Distance (cm) Between Clusters | | | | |
|---|---|---|---|---|---|
| | Treatment Number | | | | |
| | 1 | 2 | 3 | 4 | 5 (Control) |
| 0–1 | 25.7 | 24.2 | 28.2 | 28.7 | 22.2 |
| 1–2 | 21.8 | 21.4 | 22.8 | 18.9 | 18.0 |
| 2–3 | 17.9 | 19.9 | 22.2 | 18.3 | 19.3 |
| 3–4 | 22.5 | 22.2 | 21.5 | 18.0 | 18.3 |
| 4–5 | 15.5 | 16.6 | 20.0 | 16.8 | 17.2 |
| 5–6 | 13.3 | 11.4 | 17.2 | 18.0 | 16.9 |

TABLE C

The average number of flowers per cluster per plant as influenced by treatments with the microbial composition.

| Cluster | Average Flower Number/Cluster/Plant | | | | |
|---|---|---|---|---|---|
| | Treatment Number | | | | |
| | 1 | 2 | 3 | 4 | 5 (Control) |
| 1 | 5.5 | 5.3 | 5.4 | 4.4 | 5.2 |
| 2 | 9.9 | 5.4 | 7.5 | 7.2 | 7.0 |
| 3 | 8.0 | 7.2 | 7.9 | 6.2 | 6.9 |
| 4 | 6.6 | 6.1 | 6.1 | 6.9 | 5.4 |
| 5 | 4.9 | 3.0 | 5.0 | 5.4 | 5.8 |
| 6 | 2.8 | 4.8 | 4.4 | 5.7 | 4.4 |
| 7 | 5.5 | 2.0 | 2.4 | 4.0 | 3.3 |
| Total | 43.2 | 33.8 | 38.7 | 39.8 | 38.0 |

What is claimed is:

1. A method for preparing a microbial plant growth promoting composition which comprises growing a bacterial culture in a first nutrient medium under growth conditions to a cell density of from about $2 \times 10^6$ to about $10 \times 10^6$ cells/ml; growing an algal culture in a second nutrient medium under growth conditions to a cell density of from about $10 \times 10^6$ to about $20 \times 10^6$ cells/ml, and then mixing the bacterial and algal cultures together and incubating the mixture in a third nutrient medium under growth conditions at a temperature of from about 10° C. to about 40° C. to produce the final product; said growth conditions including a physiologically acceptable pH and temperature.

2. The method of claim 1, wherein the third nutrient medium is incubated for a period of from about 1 to about 4 weeks.

3. A microbial plant growth-promoting composition produced by the method of claim 1.

4. The composition of claim 3 wherein said algae is of the Division Chlorophyta.

5. The composition of claim 4 wherein said bacteria is of the genus Bacillus.

6. The composition of claim 5 wherein said algae is of the order Chlorococcales.

7. The composition of claim 6 wherein said algae is of the genus Chlorella.

8. The composition of claim 7 wherein said bacteria is of the species *B. subtilis*.

9. The composition of claim 8 wherein said algae is of the species *C. sacchorophilia*.

10. The composition of claim 3, 4, 5, 6, 7, 8 or 9 wherein the bacteria are present at a concentration of from about $4 \times 10^6$ to about $6 \times 10^6$ cells per ml. and the algae are present at a concentration of from about $14 \times 10^6$ to about $16 \times 10^6$ cells per ml.

11. The composition of claim 10, which further comprises stabilizing amounts of soresepinium, lipase and vitamin B-12.

12. The composition of claim 11, wherein the sorespinium is present at a concentration of from about 0.5% to about 2% by volume, the lipase is present at a concentration of from about 0.5% to about 2% by volume and the vitamin B-12 is present at a concentration of from about 1.5 g to about 5 g per gallon.

13. A method of promoting the growth of plants comprising applying to said plants a growth-promoting amount of the composition of claim 3 or 9.

14. A method of promoting the growth of plants comprising applying to said plants a growth-promoting amount of the composition of claim 10.

15. A method of promoting the growth of plants comprising applying to said plants a growth-promoting amount of the composition of claim 11.

16. A method of promoting the growth of plants comprising applying to said plants a growth-promoting amount of the composition of claim 12.

17. A method of claim 13 wherein said composition is applied to said plants in an amount of from about 1 to about 3 pounds/acre by irrigation or spraying.

18. The method of claim 13 wherein said composition is applied to said plants in an amount of from about 1.5 to about 2 pounds/acre.

* * * * *